United States Patent [19]

Gaymans et al.

[11] Patent Number: 4,716,214
[45] Date of Patent: Dec. 29, 1987

[54] PROCESS FOR THE PREPARATION OF POLYTETRAMETHYLENE ADIPAMIDE

[76] Inventors: Reinoud J. Gaymans, Keizerweg 25, 7548 PX Boekelo; Antonius J. P. Bongers, Julianalaan 37, 6124 AG Papenhoven-Born, both of Netherlands

[21] Appl. No.: 913,313

[22] Filed: Sep. 30, 1986

Related U.S. Application Data

[63] Continuation of Ser. No. 724,734, Apr. 18, 1985, abandoned.

[30] Foreign Application Priority Data

Apr. 19, 1984 [NL] Netherlands .......................... 8401271

[51] Int. Cl.$^4$ ............................................. C08G 69/28
[52] U.S. Cl. ................................................... 528/335
[58] Field of Search ............................................. 528/335

[56] References Cited

U.S. PATENT DOCUMENTS

| | | | |
|---|---|---|---|
| 4,408,036 | 10/1983 | Gaymans et al. | 528/335 |
| 4,446,304 | 5/1984 | Gaymans et al. | 528/335 |
| 4,460,762 | 7/1984 | Gaymans et al. | 528/335 |

*Primary Examiner*—Harold D. Anderson
*Attorney, Agent, or Firm*—Cushman, Darby & Cushman

[57] ABSTRACT

A process is disclosed for the preparation of polytetramethylene adipamide by heating in a first reaction zone, the salt of 1,4-diaminobutane and adipic acid, with from 0–25 wt. % of other polymide-forming compounds, at a pressure between 5 and 100 bars to form a prepolymer, then passing the prepolymer containing liquid reaction mixture to a second reaction zone wherein the temperature of the liquid reaction mixture is maintained above its solidification point while the pressure is simultaneously reduced, then subjecting the prepolymer containing liquid reaction mixture to after-condensation in at least one subsequent reaction zone.

13 Claims, 2 Drawing Figures

PROCESS FOR THE PREPARATION OF POLYTETRAMETHYLENE ADIPAMIDE

This is a continuation of application Ser. No. 724,734 filed Apr. 18, 1985, now abandoned.

BACKGROUND OF THE INVENTION

The present invention relates to a continuous process for the preparation of polytetramethylene adipamide (nylon 4,6) by heating the salt of 1,4 diaminobutane and adipic acid at elevated pressure and subjecting the prepolymer thus formed to after-condensation in at least one subsequent reaction zone.

Several non-continuous processes for preparing polytetramethylene adipamide are known from a number of publications. European patent application laid open to public inspection No. 39524 describes a process for the preparation of polytetramethylene adipamide in which the salt of 1,4 diaminobutane and adipic acid is converted into a prepolymer under carefully defined conditions and this prepolymer as a solid is subjected to after-condensation in a second reaction zone. A similar process is disclosed in European patent application laid open to public inspection No. 38094.

Japanese patent specification No. 17036/74 discloses a process for the preparation of nylon 4,6 in which a solid product with a relative viscosity ($\eta_{rel}$, measured at 1 gram polyamide in 100 ml of 96 wt. % concentrated $H_2SO_4$ at 20° C.) of at most 2.37 is obtained by reacting at varying temperatures.

U.S. Pat. No. 4,460,762 discloses a process for the preparation of nylon 4,6 polyamide by forming a polyamide prepolymer by the condensation reaction between 1,4-diaminobutane and adipic acid, and then after-condensing the prepolymer in the solid phase, under a water-vapor containing atmosphere.

U.S. Pat. No. 4,408,836 discloses a process for preparing nylon 4,6 polyamide by forming in a separate first stage a polyamide prepolymer by heating a salt of 1,4 diaminobutane and adipic acid, under a water vapor containing atmosphere, then in a separate second stage, after-condensing the polyamide prepolymer under a water-vapor containing atmosphere.

U.S. Pat. No. 4,446,304 discloses shaped articles molded from nylon 4,6 polyamide and a process for the production of these articles.

U.S. Pat. No. 4,463,166 disclose for preparing nylon 4,6 polyamide in a non-aqueous inert polar solvent. Higher molecular weight polyamides may be obtained following after-condensation.

None of these processes discloses a continuous operation.

For the preparation of nylon 6,6 continuous processes are known. German patent specification No. 2,417,003 discloses a process in which the salt of 1,6 diaminohexane is heated in a first reaction zone until at least 80% polycondensation is achieved, is subsequently expanded adiabatically in a second zone and, is reheated within a very short time in a third zone.

In the Netherlands patent application No. 6,603,078 laid open to public inspection, a process is described for the preparation of polyamide by pumping a salt of a diamine and dicarboxylic acid (according to the example hexamethylene adipamide) through a heated tube.

U.S. Pat. Nos. 3,900,450, 3,948,862 and 3,860,820 disclose processes for continuous preparation of nylon 6,6.

Practice has shown it is impossible to prepare nylon 4,6 with a high molecular weight and a good color (white) while using the known conditions used for producing nylon 6,6. The object of this invention is to provide a continuous process for the preparation of white nylon 4,6 with a high molecular weight.

DESCRIPTION OF THE INVENTION

According to the process of the present invention a prepolymer-containing liquid reaction mixture is prepared in two reaction zones; the first zone being operated at a pressure between 2 and 100 bars and, in the second zone, the temperature of this reaction mixture is maintained above its solidification point while the pressure thereof is simultaneously reduced.

The prepolymerization reaction is preferably effected in an autoclave 10 at a temperature of a most 230° C. for at most 40 minutes. Advantageously, the pressure during this prepolymerization is between 2 and 15 bars. Under these conditions, a prepolymer is formed which can thereafter be after-condensed to obtain very high quality final products.

Figure 1:
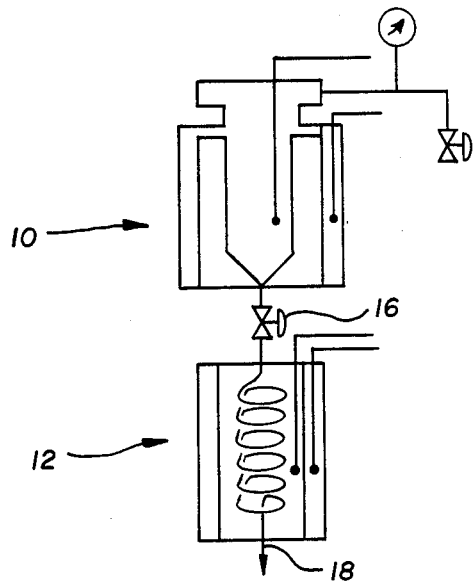
FIG. 1 shows an autoclave reaction followed by one tubular reactor.
Figure 2:
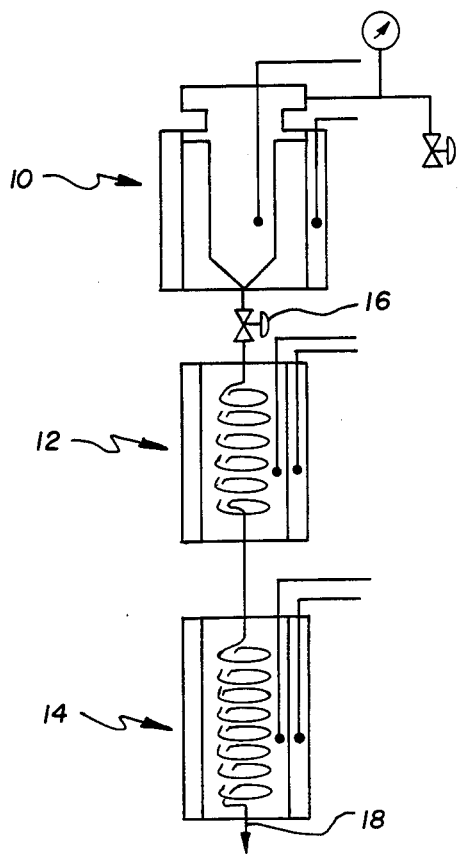
FIG. 2 shows an autoclave reactor followed by two tubular reactors.

The second reaction zone advantageously consists of a tubular reactor 12. Such a reactor has a very favorable surface:volume ratio, facilitating the transfer of heat required for keeping the reaction mixture liquid. The tube body may be arranged in a spiral or coiled form as shown in FIGS. 1 and 2.

An important additional advantage of the process according to the invention is that it can be carried out in a simple and fast way, making voluminous or expensive equipment unnecessary.

In one embodiment of the process according to the invention the length:diameter ratio of the tubular reactor is chosen so that at the end a high molecular weight liquid, white nylon 4,6 is obtained. After cooling, and optional mixing with additives, the nylon 4,6 is suitable for further processing into final products such as fibers or impact-resistant objects.

If the molecular weight of the product leaving the second reaction zone reaction is not high enough, it can be further increased by subjecting the product to after-condensation in one or more steps.

This can be effected in a number of ways.

A first method is to pass the liquid reaction mixture, subsequent to its passage through the second reaction zone, through one or more further heated tubular reaction zones 14, each of which has a diameter that is at least as large as that of the preceding tubular reaction zone. The temperature in each reaction zone is maintained at at least the solidification temperature of the reaction mixture. Advantageously, this temperature is at least 5° C. above the solidification temperature.

One of the factors determining the pressure to be applied at the end of the last reaction zone is the desired molecular weight. For number average molecular weight ($M_n$) of about 10,000, a final pressure of 1 bar will suffice.

For a higher molecular weight product, the partial pressure of water above the product may be decreased, for instance, by applying a vacuum or by passing an inert gas over the product.

It is also possible to remove the gases evolved from the reaction mixture, mainly water vapor, in between the reaction zones.

For product shaping (granulation) reasons, the gases evolved will advantageously be removed before the last reaction zone.

In such an embodiment, depending on the throughput desired, the length of the second reaction zone (the first tubular reactor 12) is from about 0.1 to about 250 m, advantageously from 10 to 150 m, while the internal diameter is between 0.05 and 5.0 cm or desirably from 0.5 to 5 cm. The required length must be sufficient to remove the gases and, the length increases with the internal diameter. The length of the subsequent reaction zones 14 is determined mainly by the desired residence time in the reaction zones.

The second tubular reactor 14 and any subsequent tubular reactors each have a diameter at least equal to that of the preceding reactor, but advantageously a diameter of between 1.05 and 5, more specifically between 1.1 and 3, times the diameter of the preceding tubular reactor 12.

The maximum temperature that can be used in the various reactors depends on the composition of the reaction mixture. For instance, the maximum temperature depends on water content and the degree of polymerization of the polyamide. The temperature in the last reactor advantageously does not exceed 310° C. The lower limit is determined by the solidification temperature of the reaction mixture. To obtain a produce with optimum color, the temperature used should be as low as possible.

At the end of the last reactor, a liquid product is drained off which can be granulated by methods already known.

A second method to convert a liquid reaction mixture into higher molecular weight product is the application of an after-condensation, reaction, optionally continuously, in the solid phase.

To promote the feasibility of this process it is desirable for the prepolymer product obtained from the second reaction zone to have a degree of polymerization high enough to enable conversion of the product into granules. For this the prepolymer formed should have an $\eta_{rel}$ of from 1.2 to 2.0. The after-condensed polyamide will desirably have an $\eta_{rel}$ of from 2.3 to 5.0.

In practice, for instance, a thread or fine stream formed of the prepolymer is cooled and chopped into granules. These granules can then be heated to a temperature between 240° C. and the melting point of that product, optionally after first drying in a fluidized bed to effect the after-condensation.

This solid phase after-condensation reaction is advantageously effected in the presence of water vapor, the partial water-vapor pressure being between 0.01 and 10 bar, advantageously from 0.05 to 1 bar.

A third method for obtaining higher molecular weight nylon 4,6 comprises reacting the product obtained from one tubular reactor, or a system of two or more of such reactors, while in the liquid form for from 1 to 60 minutes at a temperature of up to about 310° C. and under a reduced pressure or inert gas pressure.

In another embodiment of the process according to the present invention, a relatively short tube is used as a second reaction zone and a liquid reaction mixture is drained off, provided the pressure and temperature are properly chosen. This reaction mixture can then be subjected to after-condensation, for instance, (a) in the solid phase, (b) in the liquid phase in a reactor operated under reduced pressure, or (c) in a solution of the product in an inert solvent.

The manner in which the prepolymer is prepared in the first reaction zone affects the properties of the final product.

The prepolymerization is advantageously effected as described in the European patent application No. 29524. The starting material used is a solution of the salt of 1,4 diaminobutane and adipic acid in water, the water content of the solution being between 10 and 50 wt. %.

This salt solution can be prepared by dissolving dry salt in water, or by dissolving adipic acid and diaminobutane in water, simultaneously or consecutively. Optionally, the salt solution obtained by one of these methods can subsequently be evaporated until the desired water content thereof is reached. The salt solution may contain up to 25 wt. % (relative to the salt) of other polyamide-forming compounds such as caprolactam, oxalic acid, terephthalic acid, isophthalic acid and hexamethylene diamine.

The ratio between the diamine and dicarboxylic acid may be equivalent, but advantageously a slight excess of diamine is applied, in particular, between 1 and 5 mole % relative to the diamine.

In the course of the prepolymerization additives such as a catalyst, a chain length regulator or a stabilizer can be added.

Prepolymerization can be either continuous or batchwise. Because of the continuous character of the after-condensation, continuous prepolymerization is more advantageous. Advantageously, the prepolymerization conditions are chosen so that the prepolymer does not contain more than 0.20 mgeq pyrrolidine groups per gram prepolymer, specifically not more than 0.10 mgeq/g.

The present invention also relates to high-molecular weight polytetramethylene adipamide and objects made wholly or partly, from it, i.e., containing at least 10 wt. % of such polyamide.

The invention will now be elucidated by means of the following examples without being restricted to the specific embodiments described therein.

EXAMPLE I

A 250 ml autoclave 10 with valved bottom drain 16, which is connected to a tubular reactor 12 (length 4 m, internal diameter 1 mm) (FIG. 1), was used to study the polymerization of nylon 4,6. The products leaving the tubular reactor 12 via line 18 were collected in a water bath at atmospheric pressure.

The autoclave was fed with 130 gram nylon 4,6 salt (pH 7.2), to which 2.3 grams of 1,4 diaminobutane in 13 ml water was added. After purging with nitrogen, the autoclave was heated to 210° C. in 55 minutes, which was accompanied by a pressure increase to 12 bars. Subsequently, the bottom drain 16 to the hot (293° C.) tubular reactor was opened and after a short while the prepolymer dripped from the tubular reactor 12.

Fifteen minutes after opening of the bottom drain 16, a sample was taken for analysis purposes. The sample's "residence time" in the tubular reactor 12 was 40 seconds, its $\eta_{rel}$ was 1.20, and it contained 0.641 mgeq/g(—NH$_2$), 0.666 mgeq/g(—COOH) and 0.016 mgeq/g pyrrolidine groups.

Following after-condensation in the solid phase (4 hours, 260° C., $N_2/H_2O$ atmosphere) the white product had an $\eta_{rel}$ of 3.10. The $\eta_{rel}$ was measured on 1 gram of polyamide in 100 ml 98 weight % sulfuric acid at 23° C. "Residence time" is defined as:

As can be seen from Table II, "the residence time" ($t_3$) in the tubular reactor increases with the tube length, which is also attended by an increase in the pyrrolidine concentration. The higher pyrrolidine concentration would seem to impede good after-condensation in the solid form.

TABLE I

| experiments | reaction conditions | | | | | analytical results | | | | after solid phase after condensation* |
|---|---|---|---|---|---|---|---|---|---|---|
| | $t_1$ (min) | $T_1$ (°C.) | $P_1$ (bar) | $T_2$ (°C.) | $t_2$ (°C.) | (—NH$_2$) (mgeq/g) | (—COOH) (mgeq/g) | (pyr) (mgeq/g) | $h_{rel}$ | $h_{rel}$ |
| a | 240 | 190 | 10 | 283 | 20 | 0.550 | 0.757 | 0.003 | 1.24 | 2.26 |
| | | | | | 75 | 0.418 | 0.495 | 0.003 | 1.27 | 2.57 |
| b | 230 | 190 | 8.5 | 285 | 45 | 0.645 | 0.721 | 0.002 | 1.22 | 2.57 |
| | | | | | 118 | 0.536 | 0.540 | 0.002 | 1.25 | 3.40 |
| c | 60 | 205 | 10 | 290 | 25 | 0.595 | 0.525 | 0.018 | 1.24 | 3.20 |
| d | 60 | 205 | 10 | 288 | 25 | 0.800 | 0.705 | 0.017 | 1.20 | 3.00 |
| e | 55 | 210 | 12 | 293 | 15 | 0.721 | 0.659 | 0.020 | 1.20 | 3.25 |
| f | 60 | 215 | 15 | 291 | 20 | 0.768 | 0.531 | 0.039 | 1.20 | — |

*4 hours, 260° C.

TABLE II

| experiments | length | reaction conditions | | | | | | analytical results | | | after solid phase after-condensation $h_{rel}$ |
|---|---|---|---|---|---|---|---|---|---|---|---|
| | | $t_1$ (min) | $T_1$ (°C.) | $P_1$ (bar) | $T_2$ (°C.) | $t_2$ (°C.) | $t_3$ (min) | (—NH$_2$) (mgeq/g) | (—COOH) (mgeq/g) | (pyr) (mgeq/g) | |
| a | 0.5 | 50 | 204 | 14 | 300 | 6 | 1.0 | 1.710 | 1.346 | 0.020 | 3.50 |
| b | 1 | 59 | 204 | 13 | 300 | 9 | 3.5 | 1.202 | 1.025 | 0.017 | 3.75 |
| c | 2 | 55 | 207 | 12 | 302 | 9 | 9 | 1.207 | 1.074 | 0.017 | 2.80 |
| d | 3 | 50 | 207 | 13 | 300 | 10 | 17 | 1.003 | 0.918 | 0.015 | 2.80 |
| e | 4 | 55 | 210 | 12 | 293 | 15 | 40 | 0.641 | 0.666 | 0.016 | 3.10 |
| f | 4 | 60 | 208 | 12 | 298 | 18 | 50 | 0.506 | 0.458 | 0.019 | 3.14 |
| g | 7 | 60 | 210 | 13 | 289 | 20 | 125 | 0.341 | 0.193 | 0.055 | 2.64 |
| h | 12.6 | 60 | 210 | 13/21** | 295 | 25 | 275 | 0.249 | 0.173 | 0.080 | 2.53 |

*4 hours, 260° C.
**After opening of bottom drain, pressure increased from 13 to 21 bars using $N_2$ $$\frac{\text{tubular reactor volume}}{\text{prepolymer melt volume}} \times \text{total flow time}$$

assuming the reactor 12 was entirely filled with liquid.

The actual residence time of the polymer in the tubular reactor 12 can be an order of magnitude smaller, because of the two phase system (gas-liquid) in the reactor and depends on the pressure drop over the reactor and dimensions of the reactor.

EXAMPLE II

Using the apparatus and the material composition as described in Example I, further experiments were conducted, the variables being the time ($t_1$) required for heating to the prepolymerization temperature, the prepolymerization temperature ($T_1$), the prepolymerization pressure ($P_1$), the tubular reactor temperature ($T_2$) and the moment of sampling ($t_2$), i.e. the time after opening of the bottom drain. The results are given in Table I.

EXAMPLE III

Using the apparatus and material composition as described in Example I, some further experiments were conducted in which the length of the tubular reactor, whose internal diameter was 1 mm, was varied.

The samples from the 0.5 and the 1 m tubular reactors had a powder structure.

EXAMPLE IV

Using the set-up and material composition as given in Example I, but now with a second tubular reactor 14 coupled in series to the first tubular reactor (see FIG. 2), a number of additional experiments were conducted. The dimensions of the second tubular reactor are: length 5 m, internal diameter 6 mm, and the temperature of this second tubular reactor is given as $T_3$. The prepolymers prepared using this apparatus were thread-forming; the results of analysis of the products obtained are given in Table III.

EXAMPLE V

Prepolymers prepared by the method described in Example IV were used to study the after-condensation in the melt at 300° C. To this end, the drained contents were was divided into portions.

The after-condensation was studied on 3 gram samples placed in glass test tubes. After having been purged with nitrogen, the tubes were suspended in a hot Marlotherm bath, which was followed by reacting at 0.02 bar for 20 minutes. The results of these after-condensation are given in Table IV.

TABLE III

| experiment | $t_1$ (min) | $T_1$ (°C.) | $P_1$ (bar) | $T_2$ (°C.) | $T_3$ (°C.) | $t_2$ (min) | (—NH$_2$) (mgeq/g) | (—COOH) (mgeq/g) | (pyr) (mgeq/g) | $h_{rel}$ | after solid phase after-condensation $h_{rel}$ |
|---|---|---|---|---|---|---|---|---|---|---|---|
| a | 250 | 190 | 10 | 280 | 280 | 50 | 0.059 | 0.184 | 0.008 | 1.70 | — |
|   |     |     |    |     |     | 90 | 0.089 | 0.107 | 0.016 | 1.82 |   |
| b | 235 | 190 | 10 | 285 | 300 | 40 | 0.070 | 0.114 | 0.011 | 1.77 | — |
|   |     |     |    |     |     | 90 | 0.095 | 0.064 | 0.027 | 1.87 | 3.16 |
| c | 90  | 190 | 9  | 300 | 300 | 40 | 0.088 | 0.055 | 0.030 | 1.87 | 2.85 |
|   |     |     |    |     |     | 100 | 0.091 | 0.035 | 0.026 | 1.83 | 3.03 |
| d | 120 | 200 | 12.5 | 302 | 302 | 35 | 0.083 | 0.091 | 0.024 | 1.82 | 3.13 |
|   |     |     |    |     |     | 100 | 0.095 | 0.030 | 0.036 | 1.96 | 2.93 |

*4 hours, 260° C.

TABLE IV

| experiment | $t_2$ (min) | analytical results | | | | analytical results after 20 minutes at 300° C. and 0.02 bar | | | |
|---|---|---|---|---|---|---|---|---|---|
|   |   | (—NH$_2$) (mgeq/g) | (—COOH) (mgeq/g) | (Pyr) (mgeq/g) | $h_{rel}$ | (—NH$_2$) (mgeq/g) | (—COOH) (mgeq/g) | (Pyr) (mgeq/g) | $h_{rel}$ |
| a | 8  | 0.046 | 0.181 | 0.021 | 1.68 | 0.034 | 0.126 | 0.019 | 1.92 |
| b | 16 | 0.053 | 0.043 | 0.029 | 1.77 | 0.035 | 0.070 | 0.022 | 2.16 |
| c | 25 | 0.077 | 0.064 | 0.036 | 1.80 | 0.056 | 0.028 | 0.024 | 2.30 |
| d | 30 | 0.087 | 0.031 | 0.025 | 1.75 | 0.061 | 0.023 | 0.030 | 2.33 |
| e | 50 | 0.105 | 0.0201 | 0.053 | 1.77 | 0.081 | 0.016 | 0.053 | 2.30 |

EXAMPLE VI

A 10 liter autoclave with a bottom drain, which is connected to a tubular reactor with an internal diameter of 0.4 cm and a length of 5 meters, was fed with 3800 grams nylon 4,6 salt, to which 3800 grams water and 49 grams diaminobutane were added. 3500 grams water was boiled off at 2 bar after which the temperature was increased to 210° C. and held constant for 30 minutes. During this period the pressure increased to about 12 bar. Subsequently the bottom drain was opened and the contents of the autoclave passed through the tubular reactor and flashed off to atmospheric pressure. The tubular reactor was next heated to a temperature of 305° C. The "residence time" was calculated to be about 15 seconds.

The prepolymer streaming from the tubular reaction was cooled in a water bath, grinded and subject after-condensation in a rotating tumbledryer for 4 hours at 260° C. under a N$_2$/H$_2$O atmosphere. A white product with $\eta_{rel}$=4.07 was obtained. The $\eta_{rel}$ of the product before after-condensation was 1.39.

EXAMPLE VII

The experiment of example VI was repeated but with a second tubular reactor (inside diameter 4 mm) coupled in series to the first tubular reactor. Results obtained with different lengths of the reactors and at different temperatures are shown in Table V.

TABLE V

| tubular reactor 1 diameter 0.4 cm | | | tubular reactor 2 diameter 1.4 cm | | | Prepolymer | | solid phase after-condensation 4 hrs at 260° C. |
|---|---|---|---|---|---|---|---|---|
| length [m] | temp. [°C.] | 'residence time' [sec] | length [m] | temp. [°C.] | 'residence time' [sec] | $h_{rel}$ | appearance | $h_{rel}$ |
| 5  | 305 | 15   | 0  |     |      | 1.39 | white | 4.07 |
| 1  | 305 | 2.8  | 0  |     |      | 1.18 | white | 4.14 |
| 5  | 305 | 15   | 5  | 305 | 184  | 1.76(*) | some discolour | 3.63 |
| 5  | 295 | 15   | 5  | 295 | 184  | 1.40 | white | 4.13 |
| 10 | 295 | 60   | 11 | 295 | 700  | 1.64(*) | white | 4.02 |
| 15 | 295 | 112  | 5  | 295 | 450  | 1.50 | white | 4.61 |
| 15 | 295 | 118  | 11 | 295 | 1030 | 1.73(*) | white | 3.94 |
| 15 | 300 | 115  | 11 | 300 | 1000 | 1.80(*) | white | 4.07 |
| 15 | 290 | 120  | 11 | 290 | 1050 | 1.70(*) | white | 3.93 |
| 30 | 295 | 1250 | 11 | 290 | 2565 | 1.95(*) | gray  |      |

(*)Thread Forming

While the invention has now been described in what are considered to be the preferred embodiments, it should be understood that the invention is not limited to the disclosed embodiments but, is intended to cover various modifications and equivalent processes included within the spirit and scope of the appended claims, which claim scope is to be accorded the broadest interpretation so as to encompass all such modifications and equivalent processes.

What is claimed is:

1. A continuous process for the preparation of white, high molecular weight nylon 4,6 comprising the steps of:

heating in a first reaction zone a reaction mixture comprising the salt of 1,4-diaminobutane and adipic acid, with up to 25 wt. % of at least one other polyamide-forming compound, at a temperature above the solidification point of the reaction mixture and at a pressure between 2 and 100 bars to form a prepolymer-containing liquid reaction mixture, passing the liquid prepolymer mixture to a second reaction zone, wherein the mixture is maintained in a liquid state while the pressure therein is simultaneously reduced to form a second liquid prepolymer having at most 0.20 mgeq pyrrolidine groups per gram of prepolymer; and thereafter subjecting said second prepolymer liquid to at least one subsequent reaction zone, wherein the liquid prepolymer mixture is maintained in a liquid state.

2. A process according to claim 1, wherein said prepolymer-containing liquid reaction mixture is prepared at a pressure of between 2 and 15 bars.

3. A process according to claim 1 wherein the second reaction zone is a tubular reactor.

4. A process according to claim 3, wherein after said liquid reaction mixture is passed through said second reaction zone, said liquid reaction mixture is then passed in series through one or more subsequent tubular reactors each having a diameter at least equal to that of the preceding reactor.

5. A process according to claim 1, wherein at the end of the second reaction zone the gas phase evolved from the reaction mixture is removed.

6. A process according to claim 5, wherein after removal of the gas phase, the reaction mixture is subjected to after-condensation in liquid form for from 1 to 60 minutes at a temperature of up to about 310° C. and under reduced pressure or inert pressure.

7. The process of claim 1 wherein said liquid reaction mixture after passage through said second reaction zone has an $\eta_{rel}$ of at least 1.2 as measured on one gram of polyamide in 100 ml of 98 wt. % of sulfuric acid at 23° C.

8. The process according to claim 1 wherein in said subsequent reaction zone the said second liquid prepolymer mixture is subjected to an after-condensation reaction until an $\eta_{rel}$ of from 2.3 to 5.0, as measured on one gram of polyamide in 100 ml of 98 wt. % of sulfuric acid 23° C., is obtained.

9. The process of claim 1 wherein said second prepolymer liquid mixture obtained from said second reaction zone contains at most 0.10 mgeq pyrrolidine groups per gram.

10. The process according to claim 4 wherein the temperature in said subsequent reaction zone is from 240° up to at most the melting point of the nylon 4,6 polymer therein.

11. Process according to claim 10 wherein the nylon 4,6 polymer formed in said subsequent reaction zone has an $\eta_{rel}$ of 2.3 to 5.0 as measured on one gram of polyamide in 100 ml of 98 wt. % of sulfuric acid at 23° C.

12. The process of claim 4 wherein said liquid reaction mixture after passage through said second reaction zone has an $\eta_{rel}$ of about 1.2 to 2.0 as measured on one gram of polyamide in 100 ml of 98 wt. % of sulfonic acid at 20° C.

13. A continuous process for the preparation of white, high molecular weight nylon 4,6 comprising the steps of heating in a first reaction zone a reaction mixture comprising the salt of 1,4-diaminobutane and adipic acid, with 0–25 wt. % of at least one other polyamide-forming compound, at a temperature above the solidification point of the reaction mixture and up to 230° C. and at a pressure between 2 and 15 bars for a time period of up to 40 minutes to form a first prepolymer-containing liquid reaction mixture, thereafter passing said first liquid prepolymer mixture to a second reaction zone wherein the mixture is maintained in aliquid state at a temperature above its solidification point and a temperature up to 310° C. while the pressure therein is simultaneously reduced, to form a second prepolymer liquid containing at most 0.20 mgeq pyrrolidine groups per gram; and thereafter subjecting said second prepolymer liquid after solidification to at least one subsequent reaction zone at a temperature between 240° C. and the solidification point and under a partial water vapor pressure of from 0.01 to 10 bar for a time sufficient to obtain an after-condensation nylon 4,6 polymer product having an $\eta_{rel}$ of from 2.3 to 5.0 as measured on one gram of polyamide in 100 ml of 98 wt. % of sulfuric acid at 23° C.

* * * * *